(12) United States Patent
Ryner et al.

(10) Patent No.: US 10,937,024 B2
(45) Date of Patent: Mar. 2, 2021

(54) SYSTEM AND METHOD FOR A DISTRIBUTED ADJUSTMENT SYSTEM

(71) Applicant: Walmart Apollo, LLC, Bentonville, AR (US)

(72) Inventors: Douglas Jahe Ryner, Rogers, AR (US); David Martin Nelms, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 100 days.

(21) Appl. No.: 15/702,079

(22) Filed: Sep. 12, 2017

(65) Prior Publication Data

US 2018/0075449 A1 Mar. 15, 2018

Related U.S. Application Data

(60) Provisional application No. 62/394,382, filed on Sep. 14, 2016.

(51) Int. Cl.
*G06Q 30/00* (2012.01)
*G06Q 20/38* (2012.01)
(Continued)

(52) U.S. Cl.
CPC ......... *G06Q 20/387* (2013.01); *G06F 16/903* (2019.01); *G06Q 20/02* (2013.01);
(Continued)

(58) Field of Classification Search
CPC .................................. G06Q 30/0207–30/0277
(Continued)

(56) References Cited

U.S. PATENT DOCUMENTS

| 5,642,485 A | 6/1997 | Deaton et al. |
| 6,129,274 A | 10/2000 | Suzuki |

(Continued)

OTHER PUBLICATIONS

NCR introduces personalization platform for self-checkout terminals, NCR, Jan. 9, 2011.
(Continued)

*Primary Examiner* — Meredith A Long
(74) *Attorney, Agent, or Firm* — Filch, Even, Tabin & Flannery, LLP

(57) ABSTRACT

Described in detail herein are systems and methods for a distributed adjustment system. The system can include a first and second computing system. The second computing system can scan and decode an identifier encoded in a machine-readable element using a scanner. The identifier can be associated with an account tied to the first computing system. The second computing system can transmit the identifier to a broker system. The account information can include information associated with various physical objects. The second computing system can scan a machine-readable representation encoded with an identifier associated with a physical object. The broker system can determine the account holder information includes information associated with the physical object. The broker system can dynamically adjust the physical object information displayed on the display of the second computing system based on the information retrieved from the account holder information.

10 Claims, 7 Drawing Sheets

(51) Int. Cl.
*G06Q 30/06* (2012.01)
*G06Q 20/32* (2012.01)
*G06Q 20/02* (2012.01)
*G06F 16/903* (2019.01)
*G06Q 20/08* (2012.01)
*G06Q 20/10* (2012.01)
*G07G 1/01* (2006.01)

(52) U.S. Cl.
CPC ....... *G06Q 20/0855* (2013.01); *G06Q 20/102* (2013.01); *G06Q 20/3221* (2013.01); *G06Q 30/0613* (2013.01); *G06Q 30/0635* (2013.01); *G07G 1/01* (2013.01)

(58) Field of Classification Search
USPC .............................................. 705/14.1–14.73
See application file for complete search history.

(56) References Cited

U.S. PATENT DOCUMENTS

| | | |
|---|---|---|
| 6,321,210 B1 | 11/2001 | O'Brien et al. |
| 6,580,440 B1 | 6/2003 | Wagner et al. |
| 7,195,157 B2 | 3/2007 | Swartz et al. |
| 7,635,084 B2 | 12/2009 | Wang et al. |
| 8,346,634 B2 | 1/2013 | Shiftan et al. |
| 8,615,439 B2 | 12/2013 | Ramaratnam et al. |
| 8,626,595 B2 | 1/2014 | Chung |
| 8,650,124 B2 | 2/2014 | Singh |
| 8,849,683 B2 | 9/2014 | Smith |
| 9,027,827 B2 | 5/2015 | Dessert et al. |
| 9,152,999 B2 | 10/2015 | Argue et al. |
| 9,330,382 B2 | 5/2016 | Argue et al. |
| 2002/0117544 A1 | 8/2002 | Wolf et al. |
| 2003/0217892 A1 | 11/2003 | Persky |
| 2004/0064368 A1* | 4/2004 | Koser ................... G06Q 20/20 705/14.64 |
| 2008/0071614 A1 | 3/2008 | Mebruer |
| 2012/0084135 A1 | 4/2012 | Nissan et al. |
| 2013/0132854 A1* | 5/2013 | Raleigh ................ G06F 3/0482 715/738 |
| 2013/0159090 A1 | 6/2013 | Boal |
| 2013/0238456 A1* | 9/2013 | Soysa .................. G06Q 20/327 705/21 |
| 2013/0325612 A1 | 12/2013 | Sommerville et al. |
| 2015/0371254 A1 | 12/2015 | Pugh et al. |
| 2016/0034872 A1 | 2/2016 | Hendrick et al. |

OTHER PUBLICATIONS

3M TM SelfCheck QuickConnect Interface, Administrator's Guide, 2014.

Print of sales receipts—In-app setup, Selling in person—Shopify Help Center, https://help.shopify.com/manual/sellinperson/setup/receipts, last viewed Jun. 17, 2016.

Temwork Retail, Our cloud-based retail POS System: Defining Mobility in Retail Spaces with our Cloud-Based Retail POS System, http://www.teamworkretail.com/ourcloudbasedretailpossystem/, last viewed Jun. 16, 2016.

* cited by examiner

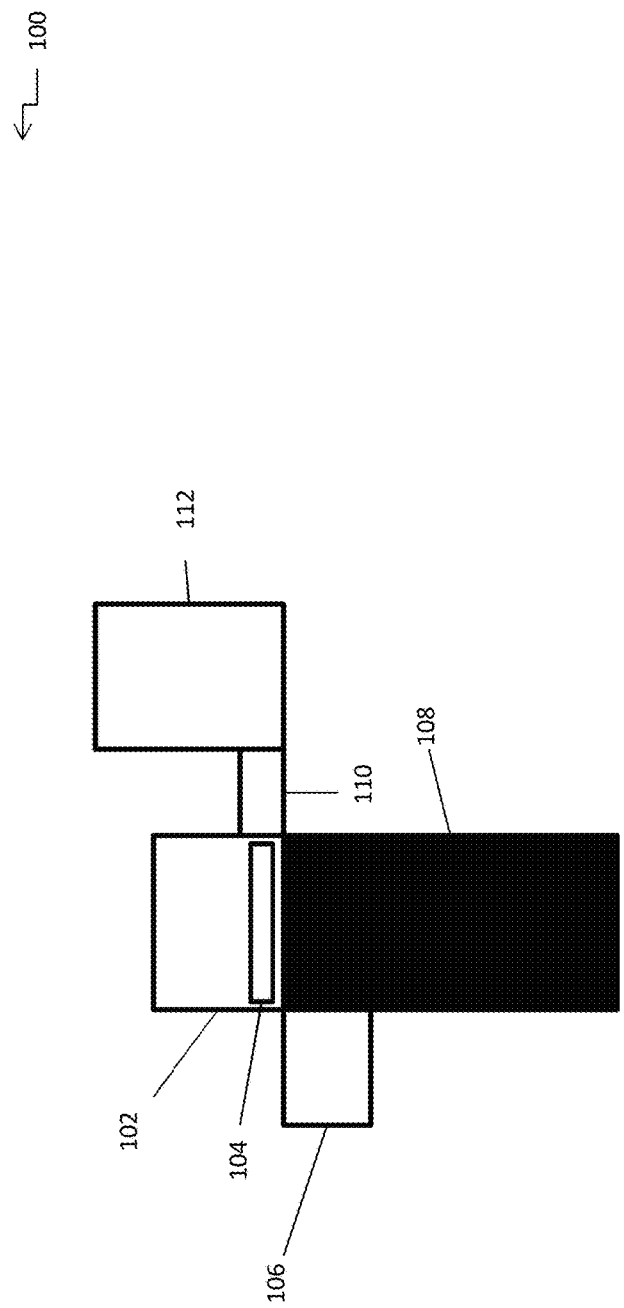

SYSTEM AND METHOD FOR A DISTRIBUTED ADJUSTMENT SYSTEM

CROSS-REFERENCE TO RELATED PATENT APPLICATIONS

This application claims priority to U.S. Provisional Application No. 62/394,382 filed on Sep. 14, 2016, the content of which is hereby incorporated by reference in its entirety.

BACKGROUND

Online sites have grown in popularity in recent years. As a result, many individuals that patronize physical facilities also have separate online accounts for those facilities corresponding online sites. Both the online sites and physical facilities may provide dedicated applications for an individual's mobile device.

SUMMARY

In one embodiment a distributed adjustment system includes a first computing system communicatively coupled to a first database storing information associated with multiple accounts. The system also includes a second computing system disposed in a facility that includes a display and a scanner and is communicatively coupled to a second database storing information associated physical objects disposed in the facility. The second computing system is configured to display on the display a graphical user interface, scan a machine-readable element associated with a first physical object, decode an object identifier from the machine readable element, query the second database using the object identifier to retrieve a first set of information associated with the first physical object, and display the first set of information associated with the first physical object on the display of the second computing system. The system further includes a broker system communicatively coupled to the first computing system, the second computing system and one or more third party computing systems. The broker system is configured to establish communication with an application executing on a user's mobile device which is interacting with the second computing system, receive from the application executing on the user's mobile device an identification of the second computing system and a first identifier identifying the user of the mobile device, and transmit a second set of information associated with the first physical object to the second computing system to dynamically adjust the graphical user interface to include the second set of information, the adjustment occurring during a transaction at the second computing system involving the user.

In another embodiment, a method performed by a distributed adjustment system includes storing information associated with multiple accounts via a first computing system communicatively coupled to a first database. The method further includes displaying a graphical user interface on a display of a second computing system. The second computing system is disposed in a facility and includes the display and a scanner and is communicatively coupled to a second database storing information associated with physical objects disposed in the facility. The method also includes, displaying on the display a graphical user interface, querying the second database using the object identifier to retrieve a first set of information associated with the first physical object, and displaying the first set of information associated with the first physical object on the display of the second computing system. The method additionally includes establishing communication between a broker system and an application executing on a user's mobile device. The user's mobile device interacts with the second computing system. The broker system is communicatively coupled to the first computing system, the second computing system and one or more third party computing systems. The method also includes receiving from the application executing on the user's mobile device, an identification of the second computing system and a first identifier identifying the user of the mobile device, and transmitting a second set of information associated with the first physical object to the second computing system to dynamically adjust the graphical user interface to include the second set of information associated with the first physical object, the adjusting occurring during a transaction at the second computing system involving the user.

BRIEF DESCRIPTION OF THE FIGURES

Illustrative embodiments are shown by way of example in the accompanying figures and should not be considered as a limitation of the present disclosure. The accompanying figures, which are incorporated in and constitute a part of this specification, illustrate one or more embodiments of the invention and, together with the description, help to explain the invention. In the figures:

FIG. 1A is a block diagram of a second computing system in accordance with an exemplary embodiment;

DETAILED DESCRIPTION

Figure 1B:
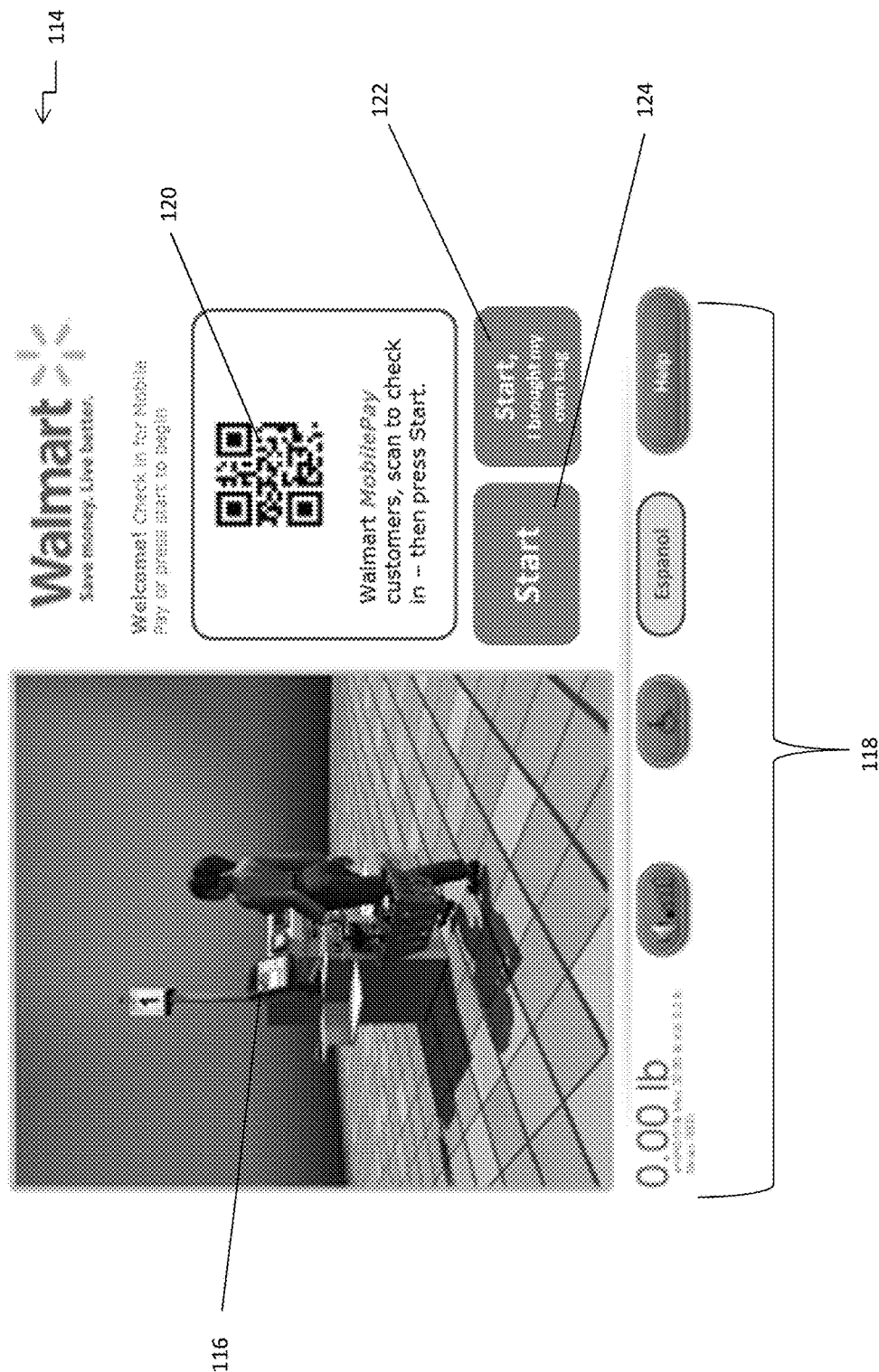
FIG. 1B is a view of an interface on the display of the second computing system before retrieving information from the first computing system in accordance with an exemplary embodiment.

Described in detail herein are systems and methods for a distributed adjustment system. In one embodiment, a broker system working in conjunction with a first online computing system, a second computing system disposed in a physical facility and one or more third party systems, works in real-time to adjust the information displayed in a graphical user interface provided by the second computing system. For example, a scanned object at the second computing system may trigger an initial display of a first set of information associated with the scanned object. The broker system may establish communication with an application executing on a mobile phone of a user interacting with the second computing system, and, through the application receive an identification of the second computing system and an identifier for an online account of the user whose data is accessed via the first computing system. The broker system may use the identifier to retrieve information about the user and based on the retrieved information, retrieve a second set of information regarding the scanned object from the second computing system or from the one or more third party systems. In one embodiment, the second set of information may be an electronic coupon that may be displayed to the user at the second computing system and may be applied to adjust a transaction.

FIG. 1A is a block diagram of a second computing system configured to update a graphical user interface based on information retrieved from a first computing system in accordance with an exemplary embodiment. The second computing system 100 can be disposed in a facility and physical objects can be disposed in the facility. The second computing system 100 can include a display 102, a reader 110, a scanner 104, a scale 106, and printer 112. The computing system 100 can be placed on a base 108. It will be appreciated that he the second computing system 100 also includes multiple other non-illustrated components.

Information associated with an account, stored at a first computing system and third party systems can be used to adjust a graphical user interface on the display 102 of the second computing system 100. The scanner 104 can be an optical scanner configured to read and decode machine-readable elements. The machine-readable elements can be barcodes, QR codes, RFID tags, or other types of machine-readable elements detectable by Near Field Communication Devices (NFC). The machine-readable elements can be encoded with an identifier. The identifier can be associated with a physical object disposed at the facility. The display 102 can be configured to display information associated with the physical objects and information associated with the at least one account. The reader 110 can be configured to read and decode information, for example information stored in magnetic card strips or a card chip. The printer 112 can be configured to print information associated to the displayed information. The scale 106 can be an electronic weighing machine configured to determine a weight of an object placed on the scale. In some embodiments, the scale can be an analog or digital scale that calculates the weight of objects using one or more strain gauges or other suitable devices that can convert a force applied to the scale by an object (e.g., from gravity) to an electrical signal.

FIG. 1B is a view of an interface on the display of the second computing system before retrieving information associated with a physical object in accordance with an exemplary embodiment. In exemplary embodiments, the second computing system (e.g. second computing system 100 as shown in FIG. 1A) can be a Point-Of-Sale (POS) terminal with a cash drawer and transaction receipt roll in a retail store. The second computing system can display interface 114 on the display (e.g. display 102 as shown in FIG. 1A). For example, interface 114 can include an instructional image 116, interface customization options 118 such as volume control, accessibility for the physically disabled, language options and a selection for "Help" if assistance is needed. Furthermore, interface 114 can also include a display of a weight of an object put on the scale (e.g. scale 106 as shown in FIG. 1A).

The interface 114 can further display a machine-readable element 120 such as a barcode or a QR code. The machine-readable element 120 can be encoded with an identifier of the second computing system. In exemplary embodiments, the machine-readable element 120 can be scanned by an application executing on a mobile device. The application can decode the machine-readable element after scanning to extract an identification of the second computing system. The identification of the second computing system and an identifier for the user of the mobile device may be sent by the application to a broker system. The broker system may use the identifier to access an account of the user via a first computing system that has stored data related to the user. In one embodiment, the first computing system may be an online store. Retrieved information from the account may be transmitted by the broker system to the second computing system for integration into the graphical user interface being provided on the display In an alternate embodiment, the second computing system can scan a machine-readable element 120 from a mobile device using a scanner (e.g. scanner 104 as shown in FIG. 1A) to obtain the identifier for the user and the second computing system may send the user identifier and the identification of the second computing system to the broker system. Subsequent to scanning the machine-readable element 120, either of the "Start" buttons 122, 124 can be selected.

Figure 1C:
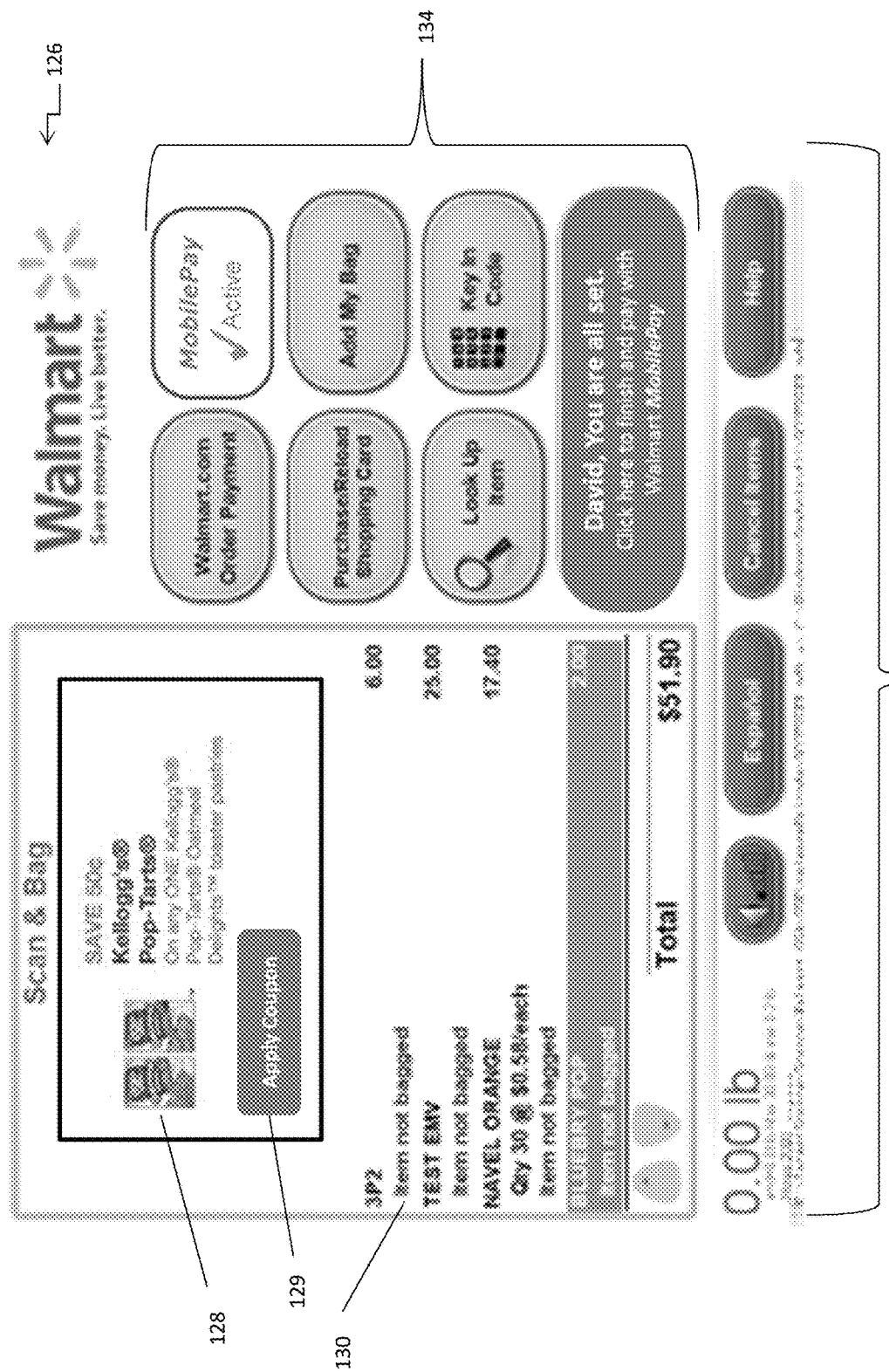
FIG. 1C is a view of an interface on the display of the second computing system after retrieving information from the first computing system in accordance with an exemplary embodiment.
Figure 1D:
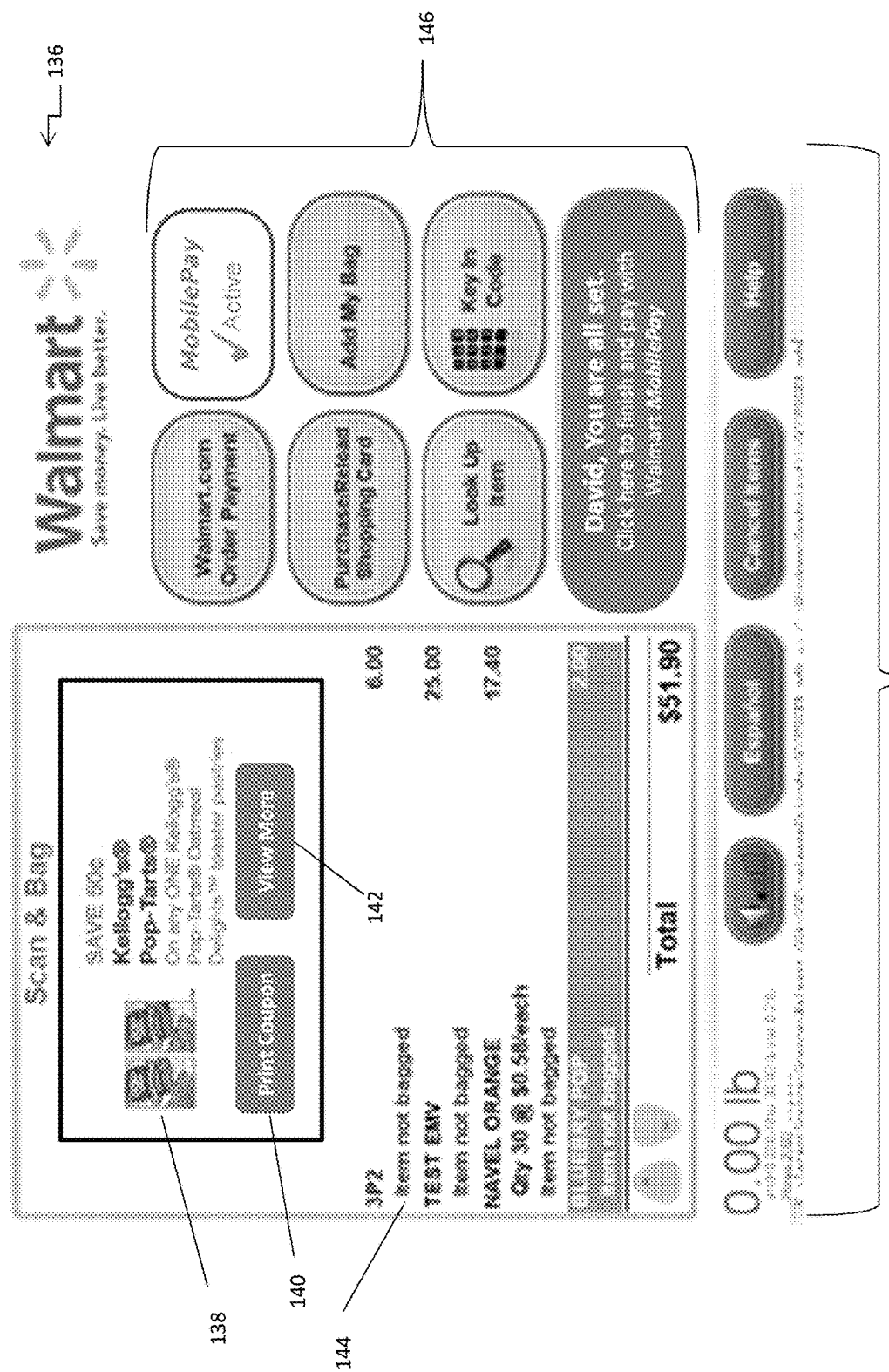
FIG. 1D is a view of an interface on the display of the second computing system after retrieving information from the first computing system in accordance with an exemplary embodiment.

FIG. 1C-D are views of interfaces displaying retrieved information associated with the physical object in accordance with an exemplary embodiment. As an example, the second computing system (e.g. second computing system 100 as shown in FIG. 1A) can be located in a physical location while the first computing system can be a virtual retail store. The second computing system can be configured to The second computing system can include the interface 126 on the display (e.g. display 102 as shown in FIG. 1A). The second computing system can scan machine-readable elements encoded with identifiers associated with items disposed at the physical retail store such as a machine-readable element on a product label. The second computing system can also retrieve information associated with the items. The retrieved information may be stored at the first computing system or various third party systems. The second computing system can retrieve the information via a broker system or directly. In one embodiment, the information can be coupons for the scanned items. The coupon 128 can be displayed on the interface 126. The coupon 128 can include an image of the item and the information related to the coupon offer. The interface 126 can also include an "Apply Coupon" selection button 129. In response to selecting the "Apply Coupon" selection button 129 the second computing system can automatically adjust the price of the item and the total price displayed on the interface 126. The interface 126 can include information associated with scanned items 130 and interface customization options 132 such as, but not limited to, volume control, accessibility for the physically disabled, language options and a selection for "Help" if assistance is needed. The information associated with scanned items 130 can include but is not limited to: a name of the physical object, a brand of the physical object, a quantity of the items scanned, and the price of each physical object. The information associated with the scanned items 130 can also include a total amount due. The interface 126 can include selection buttons 134. The displayed selection buttons 134 may be associated with an online account for an account holder. For example, selection buttons 134 can include a mobile account selection associated with the account, a selection option to complete an order for the online account, and a selection to purchase or reload a shopping card associated with the online account. The selection button 134 can also include selection buttons for looking up an item and a button enabling a key in code and/or an identifier for an item to be entered manually.

FIG. 1D, depicts another interface 136 displayed on the display (e.g. display 102 as shown in FIG. 1A) of the second computing system (e.g. second computing system 100 as shown in FIG. 1A) after retrieving information associated with a physical object. The second computing system can retrieve information associated with the items. The information is stored at the first computing system or various third party systems and may be retrieved by the second computing system via a broker system or directly. In one embodiment, the information can be coupons for the scanned items. The coupon 138 can be displayed on the interface 136. The coupon 138 can include an image of the item and the information related to the coupon offer. In another embodiment, the second computing system may display suggestions for purchases based on account information retrieved from a user's online account and/or current items being scanned at the second computing systems. The displayed suggestions may or may not be accompanied by a display of available coupons applicable to the suggested products/items. The interface 136 can include a "Print Coupon" selection button 140. In response to selecting the "Print Coupon" selection button 140 the second computing system can print the coupon using the printer (e.g. printer as shown in FIG. 1A). The interface 136 can also include a "View More" selection button 142. In response to selecting the "View More" selection button 142 the second computing system can search third party systems and the first computing system, directly or via a broker system, for coupons for the scanned items. In some embodiments, the second computing system can also provide coupons for items related to the scanned items. The interface 136 can include information associated with scanned items 130 and interface customization options 132 such as volume control, accessibility for the physically disabled, language options and a selection for "Help" if assistance is needed. The interface 136 can include selection buttons 134. For example, selection buttons 134 can include a mobile account selection associated with the account, a selection option to complete an order associated with the account, and a selection to purchase or reload a shopping card associated with the account. The selection button 134 can also include selection buttons for looking up an item and a button enabling a key in a code and/or an identifier associated with an item to be entered manually.

Figure 2:
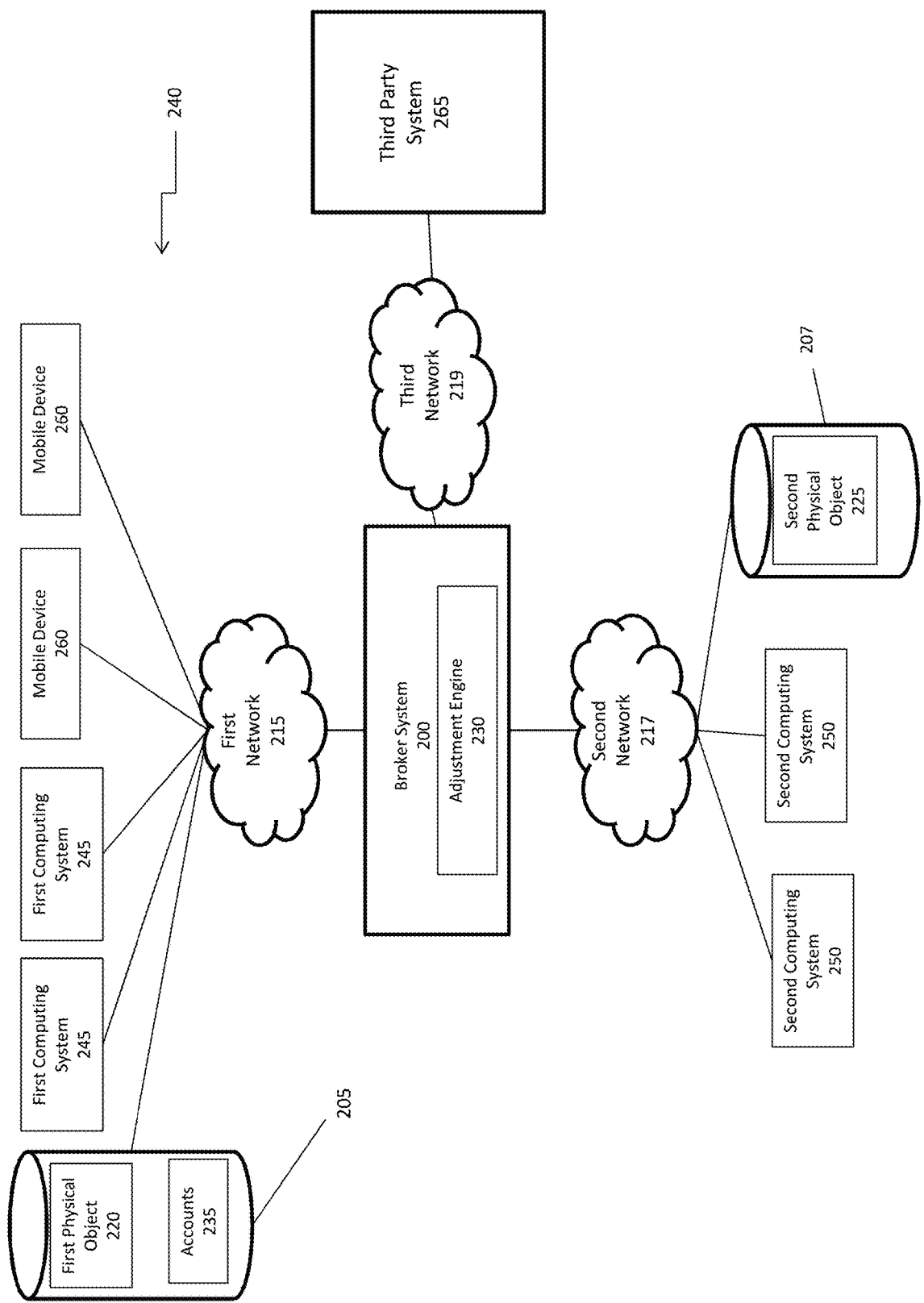
FIG. 2 is a block diagrams illustrating an automated tote routing system according to an exemplary embodiment.

FIG. 2 illustrates an exemplary automated adjustment system in accordance with an exemplary embodiment. The automated adjustment system 240 can include a first database 205, a second database 207, one or more of first computing systems 245, one or more instances of the broker systems 200, one or more of the second computing systems 250, one or more mobile devices 260 and one or more third party systems 265. In exemplary embodiments, the first computing system 245 can be in communication with the first database(s) 205 the mobile devices 260, and the broker systems 200 via a first communications network 215. The second computing system 250 can be in communication with the second database(s) 207 and the broker systems 200 via second communication network 217. The broker system 200 can be in communication with the third party systems 265, via the third communication network 219. The broker system 200 can implement at least one instance of the adjustment engine 230.

In an example embodiment, one or more portions of the first, second and third communications network 215, 217, 219 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The first computing system 245 includes one or more computers or processors configured to communicate with the broker system 200 and the first database(s) 205, via the first network 215. The first computing system 245 hosts one or more applications configured to interact with one or more components of the broker system 200 and/or facilitates access to the content of the first database(s) 205. The second computing system 250 includes one or more computers or processors configured to communicate with the broker system 200 and the second database(s) database(s) 207, via the first network 217. The second computing system 250 hosts one or more applications configured to interact with one or more components of the broker system 200 and/or facilitates access to the content of the second database(s) database(s) 207. In some embodiments, the first or second computing systems 245, 250 can host the adjustment engine 230 or portions thereof. The first database(s) 205 may store information/data, as described herein. For example, the first database(s) 205 can include first physical objects database 220 and an accounts database 235. The first physical objects database 220 can store information associated with physical objects disposed at various facilities. The accounts database 235 can store account holder information and sessions of the account holders for the first computing system 245. The first database(s) 205 can be located at one or more geographically distributed locations from each other or from the first computing system 245. Alternatively, the first database(s) 205 can be included within first computing system 245. The second database(s) 207 may store information/data, as described herein. For example, the second database(s) 207 can include second physical objects database 225. The second physical objects database 225 can store information associated with physical objects disposed at a particular facility. In some embodiments, the first physical objects database 220 can store information associated with physical objects disposed at the facility in which the second computing system 250 is located. The second database(s) 207 can be located at one or more geographically distributed locations from each other or from the second computing system 250. Alternatively, the second database(s) 207 can be included within second computing system 250.

In exemplary embodiments, the second computing system 250 may provide an identification of the second computing system via a machine-readable element displayed on the graphical user interface provided on its display. An application executing on a user's mobile device, such as an application associated with an online website related to the physical facility in which the second computing system is located, may scan and decode the identification of the second computing system that is encoded in the machine-readable element. The application on the user's mobile device may provide the identification of the second computing system and an identifier of the user related to an online account to a broker system 200. The broker system 200 can execute a adjustment engine 230 in response to receiving the identifier. The adjustment engine 230 can query the accounts database 235 using the identifier to retrieve account informant associated with the account. The account information can include information associated with various physical objects. The retrieved information may be provided to the second computing system. The second computing system 250 can scan a machine-readable representation encoded with an object identifier associated with a physical object such as a product label. The adjustment engine 230 of the broker system or the second computing system can query the second physical objects database 225 using the object identifier to retrieve information associated with the physical object. The adjustment engine 230 can coordinate with components of the second computing system to display the physical object information on the display of the second computing system 250. In one embodiment, the adjustment engine 230 can determine the account information includes information associated with the physical object. The adjustment engine 230 can also query the first physical objects database 220, the second physical objects database 225 and/or third party systems 265 for information associated the physical object. The adjustment engine 230 can dynamically adjust the physical object information displayed on the display of the second computing system 225 based on the information retrieved from the account information, the first physical objects database 220, the second physical objects database 225 and/or the third party systems 265. The adjustment engine 230 can connect with the third party system 265 using an Application Program Interface (API).

As a non-limiting example, the first computing system 245 can be online site and the second computing system 250 can be a physical location. The third party systems 265 can be various vendors for items sold at the retail store at which the second computing system 250 is disposed. The second computing system 250 can include a display with a graphical user interface. An account holder can launch an application for the online site on a mobile device 260. The mobile device 260 can scan a machine-readable element at the second computing system that contains an identification of the second computing system as outlined above. The machine-readable element can be a barcode or a QR code. In response to scanning the machine-readable element, the second computing system can communicate the identification of the second computing system and an identifier of the user's online account to the broker system 200. The broker system can execute the adjustment engine 230 using the identifier of the online account to query the accounts database 235 to retrieve account holder information associated with the identifier. In a non-limiting example, the account holder information can include a name of an account holder, payment methods, addresses, transaction history, stored coupons and account preferences.

In an alternate embodiment, the second computing system 250 can scan an online account identifier from a machine-readable element displayed by a user's mobile device and provide the identifier and an identification of the second computing system to the broker system.

The adjustment engine 230 can determine that the account holder information includes a coupon associated with a scanned item at the second computing system. The adjustment engine 230 can display the coupon on the display of the second computing system 250. The adjustment engine 230 can display an option to "Apply Coupon" on the second computing system 250. In response to selection of the "Apply Coupon" option the adjustment engine 230 can dynamically adjust the displayed price of the item based on the coupon. Alternatively, the adjustment engine 230 can display an option to "Print Coupon." In response, the selection of the "Print Coupon" the adjustment engine 230 can print the coupon using the printer at the second computing system 250.

The adjustment engine 230 can display an option to "View More" on the second computing system. In response to the selection of "View More" the adjustment engine 230 can query the first physical objects database 220, second physical objects database 225 and/or third party systems 265 for coupons associated with the scanned item. The adjustment engine 230 can display the images of the retrieved coupon(s). The image of the coupon can include an image of the item and information regarding the coupon. The adjustment engine 230 can edit and format the image of the coupon(s) to be displayed on the display of the second computing system 250. The adjustment engine 230 can display an option to "Apply Coupon" for the retrieved coupon(s) on the second computing system 250 display. In response to the selection of the "Apply Coupon" the adjustment engine 230 can dynamically adjust the price of the scanned item based on the coupon, for example by reducing a displayed price. Alternatively, the adjustment engine 230 can display an option to "Store Coupon" for the retrieved coupon(s) on the second computing system 250 display. In response to the selection of the "Store Coupon" option, the adjustment engine 230 can store the coupon in the account holder information associated with the account in the accounts database 235. Alternatively, the adjustment engine 230 can display an option to "Print Coupon." In response, the selection of the "Print Coupon" the adjustment engine 230 can print the coupon using the printer at the second computing system 250.

In some embodiments, the account preferences can include a preference to automatically apply any and all coupons associated with the scanned item. The adjustment engine 230 can dynamically adjust the price of the item displayed on the second computing system 250 display based on any coupon retrieved from the stored coupons in the account holder information, the first physical objects database 220, the second physical objects database 225 and the third party system 265.

Figure 3:
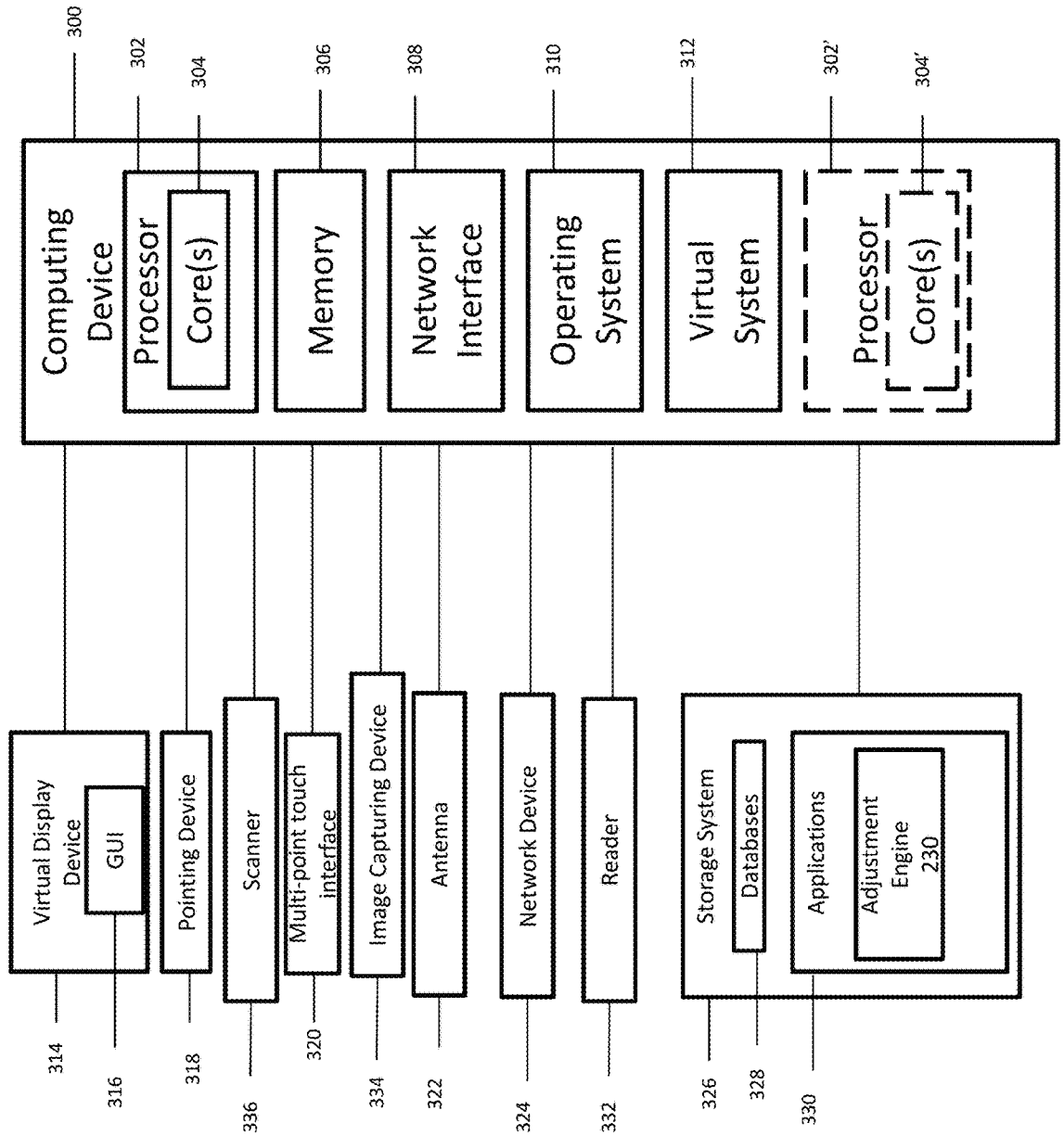
FIG. 3 is a block diagrams illustrating of an exemplary computing device in accordance with an exemplary embodiment.

FIG. 3 is a block diagram of an example computing device for implementing exemplary embodiments. Embodiments of the computing device 300 can implement the retrieving engine, the mobile device, and the first and second computing systems. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the integration engine 230) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320, a pointing device 318, an scanner 336 and a reader 332.

The computing device 300 may also include one or more storage devices 326, such as a hard-drive, CD-ROM, or other computer readable media, for storing data and computer-readable instructions and/or software that implement exemplary embodiments (e.g., applications). For example, exemplary storage device 326 can include one or more databases 328 for storing information regarding available physical objects and account holder information. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
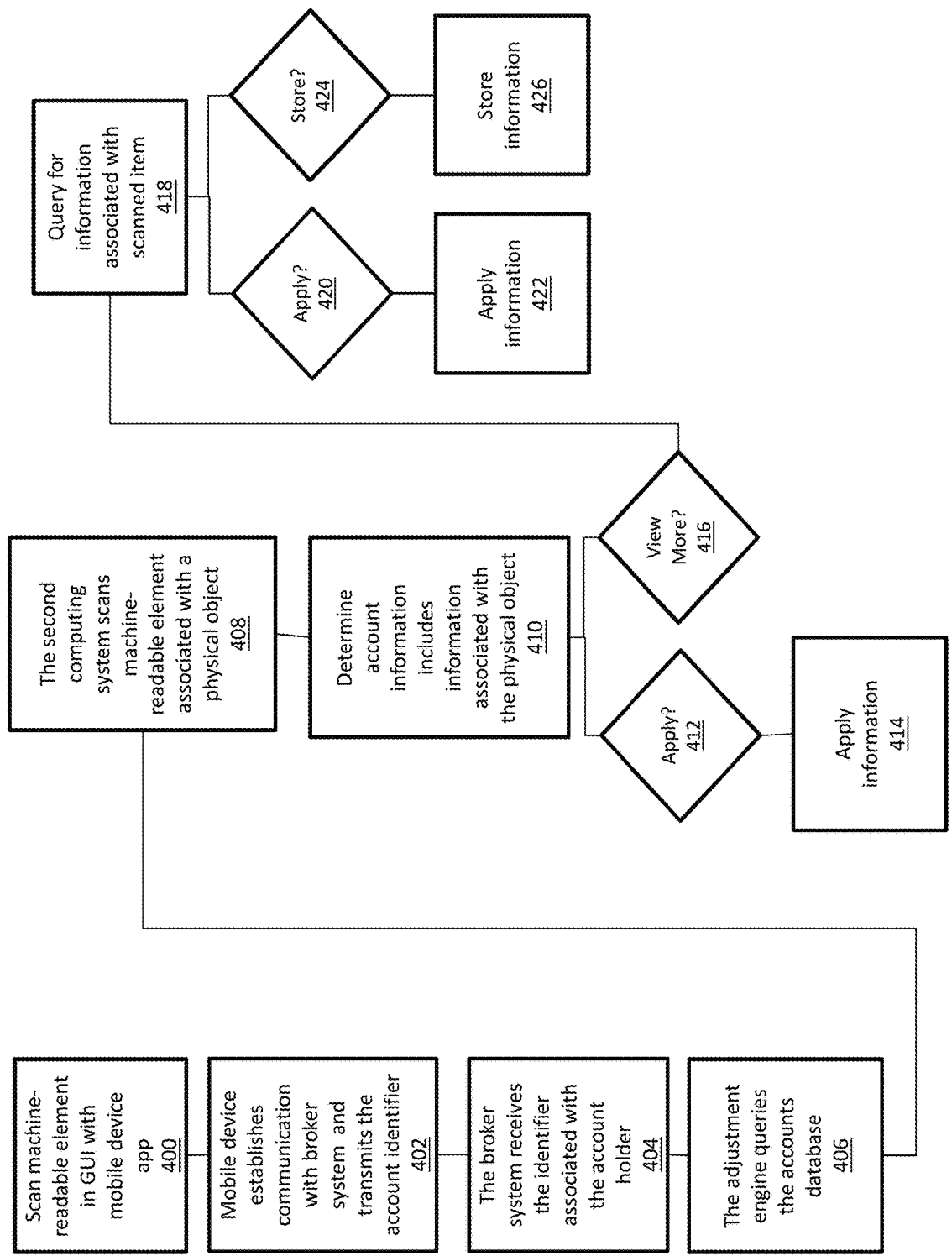
FIG. 4 is a flowchart illustrating an exemplary process in accordance with an exemplary embodiment.

FIG. 4 is a flowchart illustrating the process for the distributed adjustment system according to exemplary embodiments. In operation 400, an account holder launches a mobile application on their mobile device and reads and decodes an identification of the second computing system being displayed in a graphical user interface as a machine-readable element by the second computing system. It should be appreciated that in another embodiment the second computing system may provide the identification of the second computing system to the mobile device in another manner such as by displaying an encoded version of the identification on the display or using Bluetooth or another short-range communication protocol to provide the identification to the application executing on the mobile device. In operation 402, the application executing on the mobile device, which may be associated with the first computing system, establishes communication with a broker system and provides the identification of the second computing system and an identifier associated with the account of the account holder to the broker system (e.g. broker system 200 as shown in FIG. 2). The account can be tied to the first computing system (e.g. first computing system 245 as shown in FIG. 2). n In operation 404, the broker system receives the identifier associated with the account of the account holder (and user of the mobile device in most cases) and executes the adjustment engine (e.g. adjustment engine 230 as shown in FIG. 2).

In operation 406, the adjustment engine can query the accounts database (e.g. accounts database 235 as shown in FIG. 2) using the identifier to retrieve the associated account holder information. The account holder information can include a name of an account holder, payment methods, addresses, transaction history, coupons and account preferences.

In operation 408, the second computing system can scan a machine-readable element encoded with an identifier associated with an item sold at the retail store in which the second computing system is disposed. The adjustment engine can query the second physical objects database using the identifier to retrieve information associated with the scanned item. The adjustment engine can display the information associated the item on the display of the second computing system. For example, the information can include the name of the item, the brand of the item, quantity of scanned items and the price of the item. In operation 410, the adjustment engine can determine that the account holder information includes a coupon for the scanned item. In operation 412, the adjustment engine can display an option to apply the coupon to the scanned item on the display of the second computing system. In response to receiving a selection of applying the coupon, in operation 414 the adjustment engine can apply the coupon and dynamically adjust the displayed price of the item based on the coupon. In operation 416, the adjustment engine can display an option to view more coupons on the display of the second computing system. In response to receiving the selection of view more coupons, in operation 418 the adjustment engine can query the first physical objects database (e.g. first physical objects database 220 as shown in FIG. 2), the second physical objects database (e.g. second physical objects database 225 as shown in FIG. 2) and/or the third party systems (e.g. third party systems 265 as shown in FIG. 2) for more coupons associated with the item.

In operation 420, the adjustment engine can display an option to apply the coupon to the scanned item on the display of the second computing system. In response to receiving a selection of applying the coupon, in operation 422 the adjustment engine can apply the coupon and dynamically adjust the displayed price of the item based on the coupon. In operation 424, the adjustment engine can present an option to store the coupon currently being displayed on the display of the second computing system. In response the selection of storing the coupon, the adjustment engine can store the coupon in the account holder information associated with the account in the accounts database. Alternatively, the adjustment engine 230 can display an option to "Print Coupon." In response, the selection of the "Print Coupon" the adjustment engine 230 can print the coupon using the printer at the second computing system 250.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A distributed adjustment system comprising:
    a first computing system communicatively coupled to a first database storing information associated with a plurality of accounts;
    a second computing system disposed in a facility and including a display and a scanner and communicatively coupled to a second database storing information associated with a plurality of physical objects disposed in the facility, the second computing system configured to:
        display on the display a graphical user interface,
        scan a machine-readable element associated with a first physical object,
        decode an object identifier from the machine readable element;
        query the second database using the object identifier to retrieve a first set of information associated with the first physical object, and
        display the first set of information associated with the first physical object on the display of the second computing system, and
    a broker system communicatively coupled to the first computing system, the second computing system and one or more third party computing systems, the broker system configured to:
        retrieve at least one coupon from the one or more third party computing systems,
        establish communication with an application executing on a user's mobile device, the user's mobile device interacting with the second computing system,
        receive from the application executing on the user's mobile device an identification of the second computing system and a first identifier identifying the user of the mobile device,
        retrieve a second set of information from an account of the user in the first database using the first identifier, the second set of information including, one or more of payment methods, transaction history, stored coupons and account preferences,
        transmit the second set of information and the at least one coupon to the second computing system to dynamically adjust the graphical user interface based on the second set of information and the at least one coupon, the adjustment occurring during a transaction at the second computing system involving the user, and
        display an option to store the at least one coupon in the account of the user.

2. The system of claim 1, wherein the broker system is further configured to:
    transmit suggestions for purchases and associated coupons based on the retrieved second set of information associated with the account of the user to the second computing system, the suggestions displayed during the transaction.

3. The system of claim 1, wherein the broker system interfaces with the one or more third party computing systems using an Application Program Interface (API).

4. The system of claim 1, wherein the first and second computing systems are located in different geographic locations.

5. The system of claim 1, wherein the second set of information includes an image, the image displayed on the display.

6. The system of claim 1, wherein the second computing system enables the printing of at least one stored coupon in the second set of information.

7. A method performed by a distributed computing system, the method comprising:
    storing information associated with a plurality of accounts via a first computing system communicatively coupled to a first database;
    displaying a graphical user interface on a display of a second computing system, the second computing system disposed in a facility and including the display and a scanner and communicatively coupled to a second database storing information associated with a plurality of physical objects disposed in the facility;
    scanning a machine-readable element associated with a first physical object with the second computing system;
    decoding an object identifier from the second machine readable element;
    querying the second database using the object identifier to retrieve a first set of information associated with the first physical object,
    displaying the first set of information associated with the first physical object on the display of the second computing system, and
    with a broker system communicatively coupled to the first computing system, the second computing system and one or more third party computing systems:
        retrieving at least one coupon from the one or more third party computing systems,
        establishing communication between the broker system and an application executing on a user's mobile device, the user's mobile device interacting with the second computing system,
        receiving from the application executing on the user's mobile device an identification of the second computing system and a first identifier identifying the user of the mobile device,
        retrieving a second set of information from an account of the user in the first database using the first identifier, the second set of information including one or more of payment methods, transaction history, stored coupons and account preferences, transmitting the second set of information and the at least one coupon to the second computing system to dynamically adjust the graphical user interface based on the second set of information associated with the first physical object and the at least one coupon, the adjusting occurring during a transaction at the second computing system involving the user, and display an option to store the at least one coupon in the account of the user.

8. The method of claim 7, further comprising the broker system:

transmitting suggestions for purchases and associated coupons based on the retrieved second set of information associated with the account of the user to the second computing system, the suggestions displayed during the transaction.

9. A non-transitory computer readable memory medium storing instructions, wherein the instructions are executable by a processor to:

store information associated with a plurality of accounts via a first computing system communicatively coupled to a first database;

display a graphical user interface on a display of a second computing system, the second computing system disposed in a facility and including the display and a scanner and communicatively coupled to a second database storing information associated with a plurality of physical objects disposed in the facility;

scan a machine-readable element associated with a first physical object with the second computing system;

decode an object identifier from the second machine readable element;

query the second database using the object identifier to retrieve a first set of information associated with the first physical object, and display the first set of information associated with the first physical object on the display of the second computing system, and with a broker system communicatively coupled to the first computing system, the second computing system and one or more third party computing systems:

retrieve at least one coupon from the one or more third party computing systems, establish communication between the broker system and an application executing on a user's mobile device, the user's mobile device interacting with the second computing system, receive from the application executing on the user's mobile device an identification of the second computing system and a first identifier identifying the user of the mobile device, retrieve a second set of information from an account of the user in the first database using the first identifier, the second set of information including one or more of payment methods, transaction history, stored coupons and account preferences, transmit the second set of information and the at least one coupon to the second computing system to dynamically adjust the graphical user interface based on the second set of information associated with the first physical object and the at least one coupon, the adjusting occurring during a transaction at the second computing system involving the user, and display an option to store the at least one coupon in the account of the user.

10. The non-transitory computer readable memory medium of claim 9, wherein the instructions are further executable to:

transmit suggestions for purchases and associated coupons based on the retrieved information associated with the selected one of the plurality of accounts to the second computing system, the suggestions displayed during the transaction.

\* \* \* \* \*